(12) United States Patent
Korenaga

(10) Patent No.: US 11,208,929 B2
(45) Date of Patent: Dec. 28, 2021

(54) CONTROL DEVICE FOR VEHICLE

(71) Applicant: TOYOTA JIDOSHA KABUSHIKI KAISHA, Toyota (JP)

(72) Inventor: Shingo Korenaga, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/101,133

(22) Filed: Nov. 23, 2020

(65) Prior Publication Data
US 2021/0189936 A1 Jun. 24, 2021

(30) Foreign Application Priority Data
Dec. 24, 2019 (JP) .............................. JP2019-233407

(51) Int. Cl.
*F01N 9/00* (2006.01)
*F01N 3/20* (2006.01)
*F01N 11/00* (2006.01)
*F01N 13/00* (2010.01)

(52) U.S. Cl.
CPC .......... *F01N 3/2013* (2013.01); *F01N 11/005* (2013.01); *F01N 13/008* (2013.01)

(58) Field of Classification Search
CPC .... F01N 3/2013; F01N 3/2026; F01N 11/005; F01N 2240/16; F01N 2900/1602; F02D 41/0245
See application file for complete search history.

(56) References Cited

U.S. PATENT DOCUMENTS

| | | | | |
|---|---|---|---|---|
| 2011/0268613 A1* | 11/2011 | Hirai | ..................... | F01N 11/005 422/108 |
| 2011/0270568 A1* | 11/2011 | Hirai | ..................... | F01N 3/2026 702/133 |

FOREIGN PATENT DOCUMENTS

JP         2014-58925 A      4/2014

* cited by examiner

*Primary Examiner* — Jonathan R Matthias
(74) *Attorney, Agent, or Firm* — Oblon, McClelland, Maier & Neustadt, L.L.P.

(57) ABSTRACT

A control device comprises an estimated temperature calculation part calculating an estimated temperature of a conductive base based on an engine operating state, an electrical heating permission judgment part judging if to permit warmup of a catalyst device by electrical heating, and a catalyst warmup control part warming up the catalyst device by electrical heating when electrical heating is permitted and warming up the catalyst device by heat of exhaust discharged from the internal combustion engine when electrical heating is prohibited. The electrical heating permission judgment part prohibits warmup of the catalyst device by electrical heating when it is predicted that the actual temperature of the conductive base has diverged from the estimated temperature, when the estimated temperature is low in reliability, or when it is not possible to calculate the estimated temperature.

12 Claims, 9 Drawing Sheets

CONTROL DEVICE FOR VEHICLE

FIELD

The present disclosure relates to a control device for a vehicle.

BACKGROUND

Japanese Unexamined Patent Publication No. 2014-58925 discloses a vehicle provided with an electrically heated catalyst (EHC) comprised of a conductive base on which a catalyst is carried and arranged in an exhaust passage of the internal combustion engine wherein the temperature of the conductive base (catalyst) is estimated.

SUMMARY

In such a vehicle, if using electrical heating to warm up the catalyst device when, for example, the actual temperature and the estimated temperature of the conductive base diverge, when the estimated temperature is low in reliability, or when the estimated temperature cannot be calculated, the conductive base is liable to end up being heated more than necessary.

The present disclosure was made focusing on such a problem and has as its object to keep a conductive base from ending up being heated more than necessary.

To solve the above problem, the vehicle according to one aspect of the present disclosure is provided with an internal combustion engine and an electrically heated type of catalyst device provided in an exhaust passage of the internal combustion engine and supporting a catalyst on a conductive base generating heat by the supply of current. The control device for this vehicle is provided with an estimated temperature calculation part calculating the estimated temperature of the conductive base based on the engine operating state, an electrical heating permission judgment part judging if to permit warmup of the catalyst device by electrical heating, and a catalyst warmup control part warming up the catalyst device by electrical heating when electrical heating is permitted and warming up the catalyst device by heat of exhaust discharged from the internal combustion engine when electrical heating is prohibited. Further, the electrical heating permission judgment part is configured to prohibit warmup of the catalyst device by electrical heating at the time of at least one of the following: when it is predicted that the actual temperature of the conductive base has diverged from the estimated temperature, when the estimated temperature is low in reliability, or when it is not possible to calculate the estimated temperature.

According to this aspect of the present disclosure, when the conductive base is liable to end up being heated more than necessary, that is, when it is predicted that the actual temperature of the conductive base has diverged from the estimated temperature, when the estimated temperature is low in reliability, or when it is not possible to calculate the estimated temperature, warmup of the catalyst device by electrical heating is prohibited and the catalyst device is warmed up by the heat of exhaust discharged from the internal combustion engine. If warming up the catalyst device by exhaust heat, the actual temperature of the conductive base will only rise up to the exhaust temperature, so the conductive base can be kept from ending up being heated more than necessary.

DESCRIPTION OF EMBODIMENTS

Figure 1:
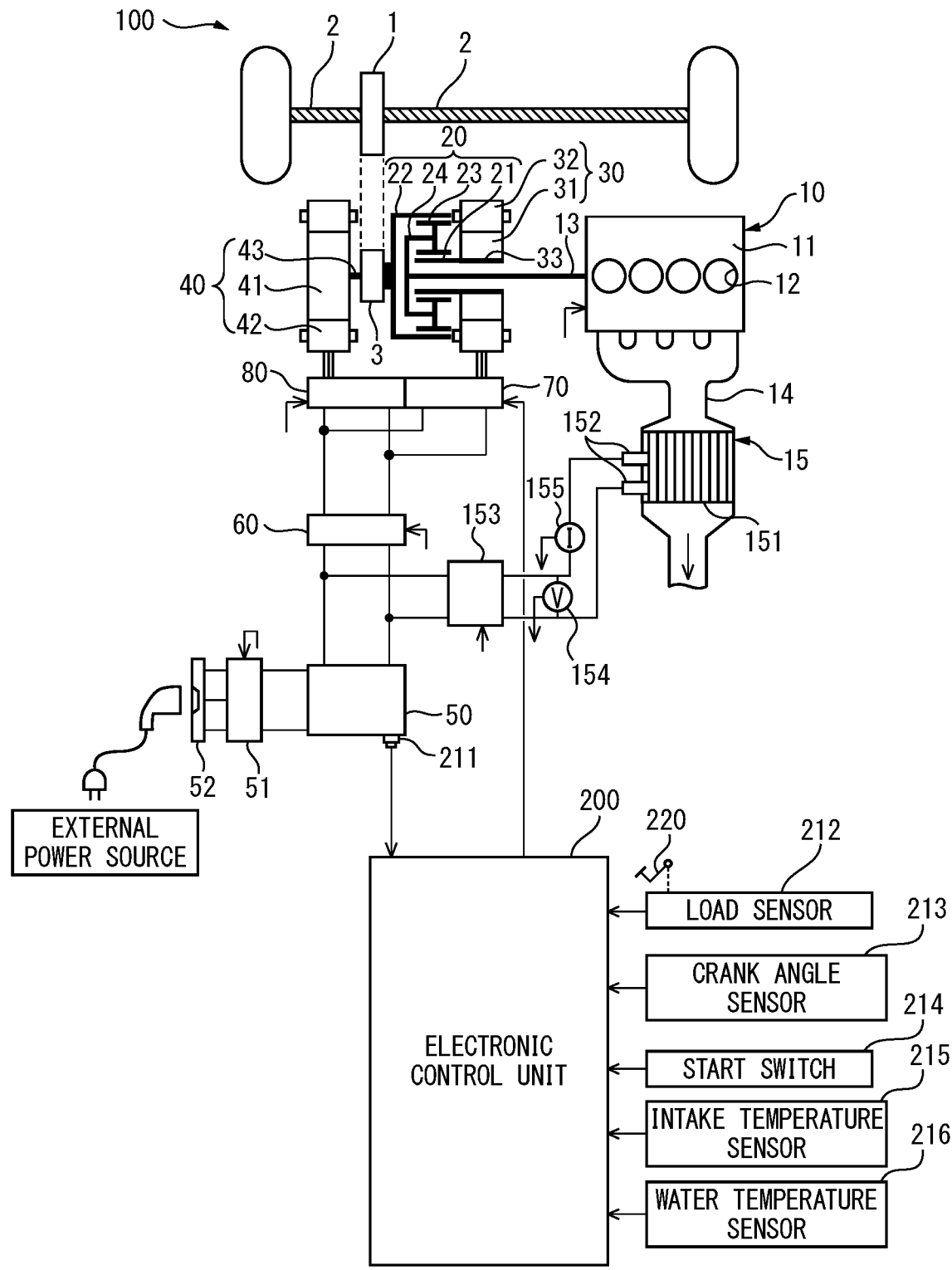
FIG. 1 is a schematic view of the configuration of a vehicle and an electronic control unit for controlling the vehicle according to one embodiment of the present disclosure.

Below, embodiments of the present disclosure will be explained with reference to the drawings. Note that, in the following explanation, similar constituent elements are assigned the same reference numerals.

FIG. 1 is a schematic view of the configuration of a vehicle 100 and an electronic control unit 200 for controlling the vehicle 100 according to a first embodiment of the present disclosure.

The vehicle 100 according to the present embodiment is a hybrid vehicle provided with an internal combustion engine 10, power dividing mechanism 20, first rotary electric machine 30, second rotary electric machine 40, battery 50, boost converter 60, first inverter 70, and second inverter 80 and is configured to be able to transmit one or both drive powers of the internal combustion engine 10 and the second rotary electric machine 40 through a final speed reduction device 1 to a wheel drive shaft 2.

The internal combustion engine 10 makes fuel burn in cylinders 12 formed in the engine body 11 to generate drive power for making an output shaft 13 coupled to a crankshaft (not shown) rotate. The exhaust discharged from the cylinders 12 to an exhaust passage 14 flows through the exhaust passage 14 and is discharged into the atmosphere. The exhaust passage 14 is provided with an electrically heated catalyst device 15 for removing harmful substances in the exhaust.

The electrically heated catalyst device 15 is provided with a conductive base 151, a pair of electrodes 152, a voltage adjustment circuit 153, a voltage sensor 154, and a current sensor 155.

The conductive base 151 is for example formed from silicon carbide (SiC) or molybdenum disulfide ($MoSi_2$) or another material generating heat upon being supplied with current. The conductive base 151 is formed with a plurality of passages (below, "unit cells") of lattice shaped (or honeycomb shaped) cross-sections along the direction of flow of exhaust. The surfaces of the unit cells carry the catalyst. The catalyst carried at the conductive base 151 is not particularly limited. It is possible to suitably select the catalyst required for obtaining the desired exhaust purification performance from among various catalysts and make the conductive base 151 carry it.

The pair of electrodes 152 are parts for applying voltage to the conductive base 151. The pair of electrodes 152 are respectively electrically connected to the conductive base 151 and are connected through the voltage adjustment circuit 153 to the battery 50. By applying voltage to the conductive base 151 through the pair of electrodes 152, current flows through the conductive base 151 so the conductive base 151 generates heat and the catalyst carried on the conductive base 151 is heated.

The voltage $V_h(V)$ applied to the conductive base 151 by the pair of electrodes 152 (below, referred to as the "base applied voltage") can be adjusted by using the electronic control unit 200 to control the voltage adjustment circuit 153. For example, it is possible to apply the voltage of the battery 50 as it is or to apply the voltage of the battery 50 boosted or lowered to any voltage. In this way, in the present embodiment, by using the electronic control unit 200 to control the voltage adjustment circuit 153, it becomes possible to control the electric power $P_h(kW)$ supplied to the conductive base 151 (below, referred to as the "base supplied electric power") to any electric power.

The voltage sensor 154 detects the base applied voltage $V_h$. In the present embodiment, the voltage adjustment circuit 153 is controlled based on the base applied voltage $V_h$ detected by the voltage sensor 154 so that the base applied voltage $V_h$ becomes a predetermined rated voltage $V_{max}$.

The current sensor 155 detects the value of the current $I_h(A)$ flowing through the conductive base 151 when applying voltage to the conductive base 151. In the present embodiment, it detects the resistance value R (Ω) of the conductive base 151 (below, referred to as the "base resistance value") based on the base applied voltage $V_h$ and the current value $I_h$.

The power division mechanism 20 is a planetary gear for dividing the power of the internal combustion engine 10 into two systems of the power for turning the wheel drive shaft 2 and power for driving the first rotary electrical machine 30 in a regeneration mode and is provided with a sun gear 21, ring gear 22, pinion gears 23, and a planetary carrier 24.

The sun gear 21 is an external gear and is arranged at the center of the power division mechanism 20. The sun gear 21 is connected with a shaft 33 of the first rotary electrical machine 30.

The ring gear 22 is an internal gear and is arranged around the sun gear 21 so as to become concentric with the sun gear 21. The ring gear 22 is connected with a shaft 33 of the second rotary electrical machine 40. Further, the ring gear 22 has integrally attached to it a drive gear 3 for transmitting rotation of the ring gear 22 to the wheel drive shaft 2 through the final deceleration device 1.

A pinion gear 23 is an external gear. A plurality are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotary electrical machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotary electrical machine 30 has the function of a motor receiving the supply of power from the battery 50 and being driven in a power running mode and the function of a generator receiving power from the internal combustion engine 10 and being driven in a regeneration mode.

In the present embodiment, the first rotary electrical machine 30 is mainly used as a generator. Further, when making the output shaft 13 rotate for cranking at the time of startup of the internal combustion engine 10, it is used as a motor and plays the role of a starter.

The second rotary electrical machine 40 is, for example, a three-phase AC synchronous type motor-generator. It is provided with a rotor 41 attached to the outer circumference of the shaft 43 connected to the ring gear 22 and having a plurality of permanent magnets embedded in its outer circumferential part and with a stator 42 around which an excitation coil generating a rotating magnetic field is wound. The second rotary electrical machine 40 has the function as a motor receiving the supply of power from a battery 50 and being driven in a power running mode and the function as a generator receiving power from the wheel drive shaft 2 and being driven in a regeneration mode at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotary electrical machine 40 so as to enable charged power of the battery 50 to be supplied to the first rotary electrical machine 30 and second rotary electrical machine 40 and drive them in the power running mode and, further, so as to enable the generated power of the first rotary electrical machine 30 and second rotary electrical machine 40 to charge the battery 50.

Further, the battery 50 according to the present embodiment is, for example, configured to be able to be electrically connected to the external power source through the charging control circuit 51 and a charging lid 52 so that charging from a home electrical outlet or other external power source becomes possible. Therefore, the vehicle 100 according to the present embodiment is a so-called "plug-in hybrid vehicle". The charging control circuit 51 is an electrical circuit which can convert the AC current supplied from the external power source to DC current based on a control signal from the electronic control unit 200 and can boost the input voltage to the battery voltage and charge the electric power of the external power source to the battery 50.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotary electrical machine 40.

The electronic control unit 200 is a microcomputer provided with components connected to each other by a bidirectional bus such as a central processing unit (CPU), read only memory (ROM), random access memory (RAM), or other memory, input port, and output port.

The electronic control unit 200 receives as input the output signals from various types of sensors such as the above-mentioned voltage sensor 154 or current sensor 155 and also an SOC sensor 211 for detecting a state of charge of the battery SOC, a load sensor 212 generating an output voltage proportional to the amount of depression of an accelerator pedal 220, a crank angle sensor 213 generating an output pulse as a signal for calculating the engine speed etc. each time a crankshaft (not shown) of the engine body 11 rotates by, for example, 15°, a start switch 214 for judging startup and stopping of the vehicle 100, an intake temperature sensor 215 for detecting an intake temperature, and a water temperature sensor 216 for detecting an engine water temperature.

The electronic control unit 200 drives various control components to control the vehicle 100 based on output signals of various sensors which have been input etc. Below, the control of the vehicle 100 according to the present embodiment which the electronic control unit 200 performs will be explained.

The electronic control unit 200 drives the vehicle 100 while switching the driving mode to either of an EV (electric vehicle) mode or a CS (charge sustaining) mode based on the state of charge of the battery SOC. Specifically, the electronic control unit 200 sets the driving mode of the vehicle 100 to the EV mode if the state of charge of the battery is equal to or greater than a predetermined state of charge for switching the mode SOC1 (for example 10% of a full charged state).

The EV mode is a mode in which the charged electric power of the battery 50 is preferentially utilized to drive the second rotary electric machine 40 for powered operation and at least the drive power of the second rotary electric machine 40 is transmitted to the wheel drive shaft 2 to make the vehicle 100 run.

When the driving mode is the EV mode, the electronic control unit 200 makes the internal combustion engine 10 stop and, in that state, uses the charged electric power of the battery 50 so as to drive the second rotary electric machine 40 for powered operation and uses the drive power of the second rotary electric machine 40 alone to turn the wheel drive shaft 2 and make the vehicle 100 run. That is, when the driving mode is the EV mode, the electronic control unit 200 makes the internal combustion engine 10 stop and, in that state, controls the output of the second rotary electric machine 40 to make the vehicle 100 run based on the driving load so as to obtain the demanded output corresponding to the driving load.

On the other hand, the electronic control unit 200 sets the driving mode of the vehicle 100 to the CS (charge sustaining) mode when the state of charge of the battery SOC is less than the state of charge for switching the mode SOC1.

The CS mode is the mode where the vehicle 100 is driven so as to maintain a state of charge of the battery (below, referred to as the "charge sustaining amount") when the state of charge of the battery (SOC) is switched to the CS mode.

Figure 2:
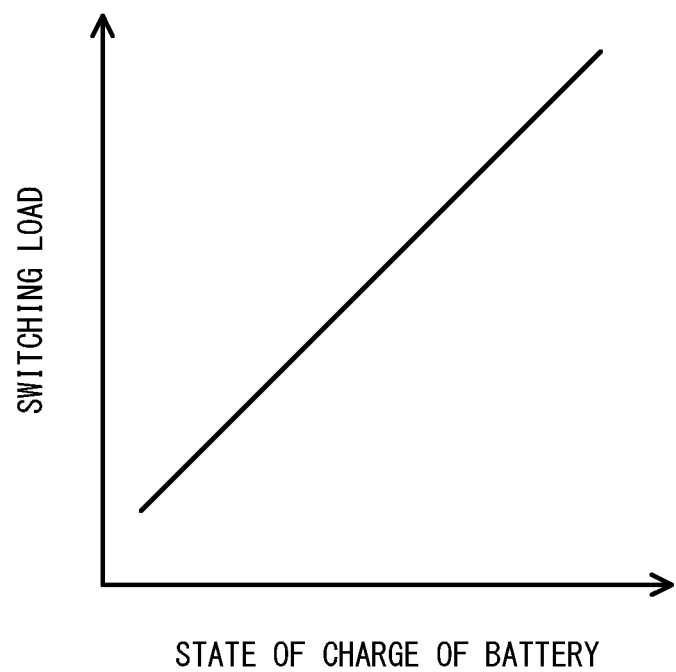
FIG. 2 is a view showing a relationship between a state of charge of the battery and a switching load.

When the driving mode is the CS mode, the electronic control unit 200 switches the driving mode to further either a CSEV mode or a CSHV mode to make the vehicle 100 run. Specifically, when the driving mode is the CS mode, if the driving load is less than the switching load, the electronic control unit 200 sets the driving mode to the CSEV mode while if the driving load is equal to or greater than the switching load, it sets the driving mode to the CSHV mode. Further, as shown in FIG. 2, the electronic control unit 200 makes the switching load change in accordance with the state of charge of the battery SOC so that the switching load becomes smaller the smaller the state of charge of the battery SOC.

The CSEV mode, in the same way as the above-mentioned EV mode, is a mode in which the charged electric power of the battery 50 is preferentially utilized to drive the second rotary electric machine 40 for powered operation and at least the drive power of the second rotary electric machine 40 is transmitted to the wheel drive shaft 2 to make the vehicle 100 run. That is, it is a mode in which the internal combustion engine 10 is made to stop and, in that state, the charged electric power of the battery 50 is used to drive the second rotary electric machine 40 for powered operation and the drive power of the second rotary electric machine 40 alone is used to make the wheel drive shaft 2 rotate and make the vehicle 100 run.

The CSHV mode is a mode in which the internal combustion engine 10 is made to operate and the generated electric power of the first rotary electric machine 30 is preferentially utilized to drive the second rotary electric machine 40 for powered operation and the drive powers of both of the internal combustion engine 10 and the second rotary electric machine 40 are transmitted to the wheel drive shaft 2 to make the vehicle 100 run. When the driving mode is the CSHV mode, the electronic control unit 200 divides the drive power of the internal combustion engine 10 into two systems by the power dividing mechanism 20, transmits one divided drive power of the internal combustion engine 10 to the wheel drive shaft 2, and uses the other drive power to drive the first rotary electric machine 30 for regenerative operation. Further, basically, the generated electric power of the first rotary electric machine 30 is used to drive the second rotary electric machine 40 for powered operation. In addition to one divided drive power of the internal combustion engine 10, the drive power of the second rotary electric machine 40 is transmitted to the wheel drive shaft 2 to make the vehicle 100 run.

In this way, when the driving mode is the CS mode, the electronic control unit 200 controls the outputs of the internal combustion engine 10 and the second rotary electric machine 40 to make the vehicle 100 run so as to obtain a demanded output corresponding to the driving load based on the state of charge of the battery SOC and the driving load. The switching load when the state of charge of the battery SOC is the state of charge for switching the mode SOC1 is low, so when the state of charge of the battery SOC falls to the state of charge for switching the mode SOC1 while the vehicle is running and the driving mode is switched from the EV mode to the CS mode, basically the internal combustion engine 10 is started up. Therefore, the CS mode can also be said to be basically a driving mode predicated on making the internal combustion engine 10 operate wherein under conditions of a poor heat efficiency of the internal combustion engine 10, the output of the second rotary electric machine 40 alone can be used to make the vehicle 100 run.

Note that when the driving mode is the CS mode, when the vehicle 100 is stopped and the state of charge of the battery becomes less than the charge sustaining amount, the electronic control unit 200 uses the drive power of the internal combustion engine 10 to drive the first rotary electric machine 30 for regenerative operation so that the state of charge of the battery becomes equal to or greater than the charge sustaining amount and uses the generated electric power of the first rotary electric machine 30 to charge the battery 50.

Here, as explained above, the CS mode is basically a driving mode predicated on making the internal combustion engine 10 operate. After the driving mode is switched from the EV mode to the CS mode, basically the internal combustion engine 10 is started up. Further, the EV mode is switched to the CS mode dependent on the state of charge of the battery SOC. If the EV mode is switched to the CS mode and the internal combustion engine 10 is started up, the exhaust discharged from the exhaust passage 14 from the cylinders 12 of the engine body 11 flow through the exhaust passage 14 and is discharged into the atmosphere.

The harmful substances in the exhaust can be removed by the catalyst device 15 if the catalyst device 15 finishes being warmed up, that is, if the temperature of the conductive base 151 (below, referred to as the "catalyst bed temperature") becomes equal to or greater than a predetermined activation temperature TEHC2 (for example 450° C.) at which the exhaust purification function of the catalyst supported on the conductive base 151 starts to come into play.

On the other hand, right after the internal combustion engine 10 is started up or otherwise before the catalyst device 15 finishes warming up, while the exhaust purification function of the catalyst supported on the conductive base 151 starts to come into play if the catalyst bed temperature becomes equal to or greater than a predetermined activation start temperature TEHC1 (for example 300° C.) lower than the activation temperature TEHC2, the harmful substances in the exhaust cannot be sufficiently removed by the catalyst device 15, so the exhaust emission deteriorates. Therefore, to keep the exhaust emission from deteriorating after engine startup, it is desirable to start the supply of current to the conductive base 151 to start warmup of the catalyst device 15 during the EV mode and complete warmup of the catalyst device 15 before switching to the CS mode.

Therefore, in the present embodiment, when the state of charge of the battery SOC falls to the state of charge for starting warmup SOC2 larger than the state of charge for switching the mode SOC1 in the EV mode, the conductive base 151 starts to be supplied with current to warm up the catalyst device 15 if the catalyst bed temperature is less than the activation start temperature TEHC1. Note that, in the present embodiment, the state of charge for starting warmup SOC2 is set in accordance with the following formula (4) as explained below.

That is, the amount of heat Q (J) required for making the catalyst bed temperature rise from a certain initial temperature TEHC0 to the activation temperature TEHC2, that is, the amount of electric power (below, referred to as the "amount of base heating-use electric power") $W_h$ (Ws), can be expressed by the following formula (1) if designating the heat capacity of the conductive base 151 as "C":

[Mathematical 1]

$$W_h = C \times (TEHC2 - TEHC0) \tag{1}$$

Further, the base supplied power $P_h$ in the case of, like in the present embodiment, controlling the base applied voltage $V_h$ to a certain rated voltage $V_{max}$ to heat the conductive base 151 can be expressed by the following formula (2) using the initial value of the base resistance R0. The initial value of the base resistance R0 is a typical resistance value of the conductive base 151 at the time of product shipment found in advance by experiments etc. and is stored in the memory.

[Mathematical 2]

$$P_h = \frac{V_{max}^2}{R0} \tag{2}$$

Therefore, if, like in the present embodiment, controlling the base applied voltage $V_h$ to a certain rated voltage $V_{max}$ to heat the conductive base 151, the heating time $t_h$(s) required for raising the catalyst bed temperature from the initial temperature TEHC0 to the activation temperature TEHC2 can be expressed by the following formula (3):

[Mathematical 3]

$$t_h = \frac{W_h}{P_h} \tag{3}$$

Further, if starting the supply of current to the conductive base 151 to warm up the catalyst device 15 during the EV mode, in addition to the base supplied electric power $P_h$ supplied to the conductive base 151 for heating the conductive base 151, electric power for driving the second rotary electric machine 40 for powered operation and electric power for driving the air-conditioner and other various auxiliary equipment, that is, electric power for powered operation $P_p$ for driving the vehicle 100, becomes necessary.

Therefore, if designating $W_p$ to be the amount of electric power for powered operation required for making the vehicle 100 run in the EV mode for exactly the heating time $t_h$, if setting the state of charge for starting warmup SOC2 to, for example, the following formula (4) and starting supply of current to the conductive base 151 to start warming up the catalyst device 15 when the state of charge of the battery SOC falls to the state of charge for starting warmup SOC2 in the EV mode, it is possible to suitably complete the warmup of the catalyst device 15 during the EV mode before the state of charge of the battery SOC falls from the state of charge for starting warmup SOC2 to the state of charge for switching the mode SOC1. Note that, the amount of electric power $W_p$ for powered operation, for example, can be calculated based on the following formula (5) if finding in advance by experiments etc. the average amount of electric power $W_{av}$ per unit time used when making the vehicle 100 run in the EV mode.

[Mathematical 4]

$$SOC2 = W_h + W_p + SOC1 \quad (4)$$

$$W_p = W_{av} \times t_h \quad (5)$$

Further, as explained above, in the present embodiment, when in the EV mode the state of charge of the battery SOC falls to the state of charge for starting warmup SOC2, if the catalyst bed temperature is less than the activation start temperature TEHC1, the conductive base 151 starts to be supplied with current to try to warm up the catalyst device 15. For this reason, it is necessary to obtain a grasp of the catalyst bed temperature.

The catalyst bed temperature, for example, may conceivably also be directly detected by attaching a temperature sensor to the conductive base 151, but there is the problem that it is difficult to attach a temperature sensor after sufficiently securing insulation from the conductive base 151. For this reason, in the present embodiment, the catalyst bed temperature is basically estimated based on the engine operating state. Below, referring to FIG. 3, the control for estimation of the catalyst bed temperature based on the engine operating state according to the present embodiment will be explained. Note that, in the following explanation, for convenience, the catalyst bed temperature estimated by the control for estimation of the catalyst bed temperature will be referred to as the "estimated bed temperature $TEHC_{est}$" and the actual catalyst bed temperature will be referred to as the "actual bed temperature $TEHC_{act}$".

Figure 3:
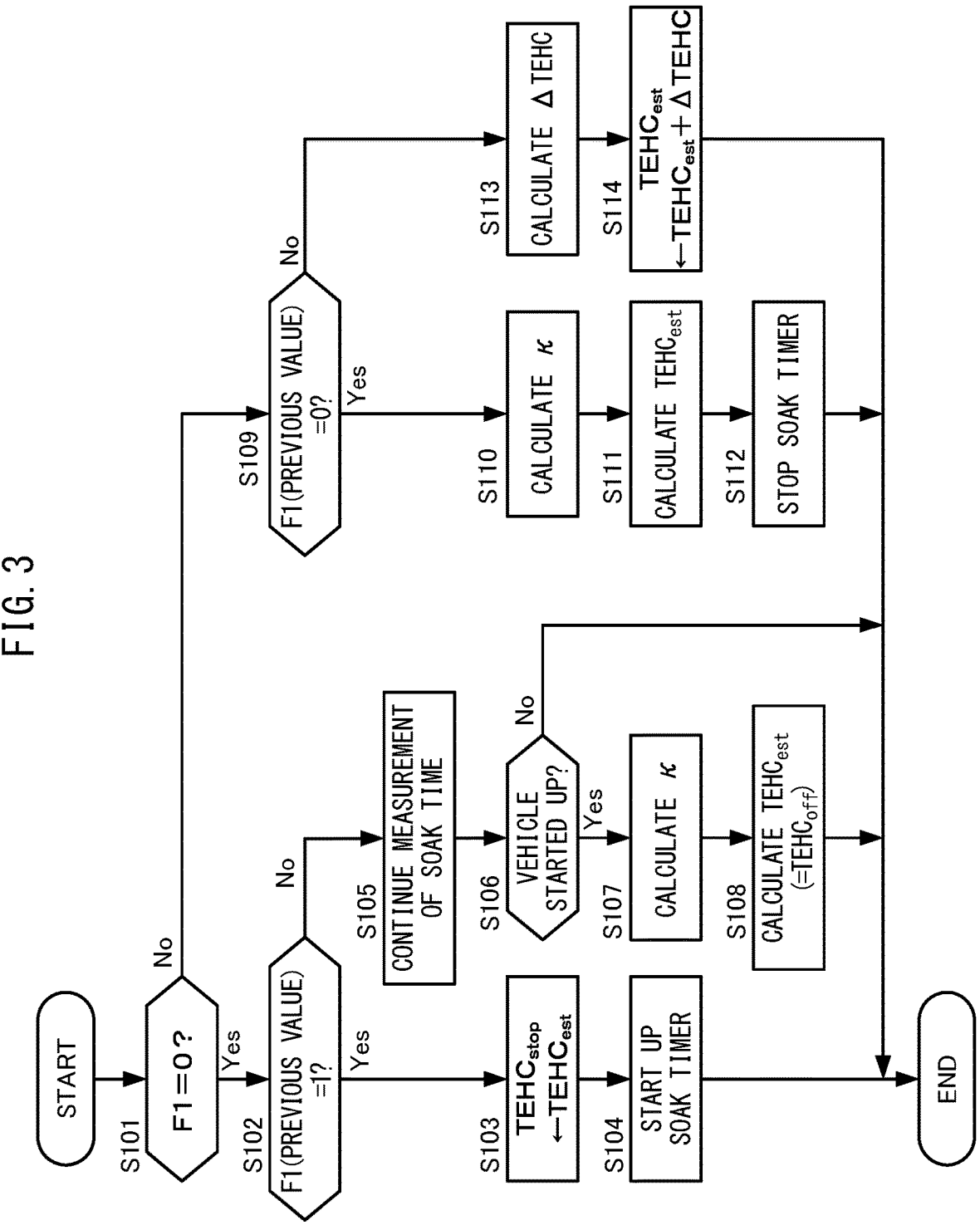
FIG. 3 is a flow chart explaining control for estimation of the catalyst bed temperature according to one embodiment of the present disclosure.

FIG. 3 is a flow chart explaining control for estimation of the catalyst bed temperature according to the present embodiment. The electronic control unit 200 repeatedly performs the present routine by a predetermined processing period (for example 10 ms).

At step S101, the electronic control unit 200 reads the engine operation flag F1 and judges if the engine operation flag F1 has been set to "0". The engine operation flag F1 is a flag which is set separately from the present routine. It is a flag which is set to "1" when making the internal combustion engine 10 start up and which is returned to "0" when making the internal combustion engine 10 stop. The initial value is set to "0". If the engine operation flag F1 is "0", the electronic control unit 200 proceeds to the processing of step S102. On the other hand, if the engine operation flag F1 is "1", the electronic control unit 200 proceeds to the processing of step S109.

At step S102, the electronic control unit 200 judges if the previous value of the engine operation flag F1 was "1", that is, whether the time is right after the engine was stopped (whether the processing is the first one after the engine was stopped). If the previous value of the engine operation flag F1 was "1", that is, if the time is right after the engine was stopped, the electronic control unit 200 proceeds to the processing of step S103. On the other hand, if the previous value of the engine operation flag F1 was not "1", that is, if the engine had already been stopped, the electronic control unit 200 proceeds to the processing of step S105.

At step S103, the electronic control unit 200 stores the estimated bed temperature $TEHC_{est}$ currently stored in the memory (estimated bed temperature $TEHC_{est}$ estimated during engine operation and stored in the memory in later explained step S114) as the "catalyst bed temperature when the engine is stopped $TEHC_{stop}$ (right after the engine is stopped)" in a separate memory.

At step S104, the electronic control unit 200 starts the soak timer for measuring the elapsed time from when the internal combustion engine 10 was started up (below, referred to as the "soak time") and starts to measure the soak time.

At step S105, the electronic control unit 200 continues to measure the soak time by the soak timer.

At step S106, the electronic control unit 200 judges if the vehicle 100 is being started up, that is, if the start switch 214 has become the ON state. If the vehicle 100 is being started up, the electronic control unit 200 proceeds to the processing of step S107. On the other hand, if the vehicle 100 is not being started up (if the start switch 214 has become the OFF state), the electronic control unit 200 ends the current processing.

Figure 4:
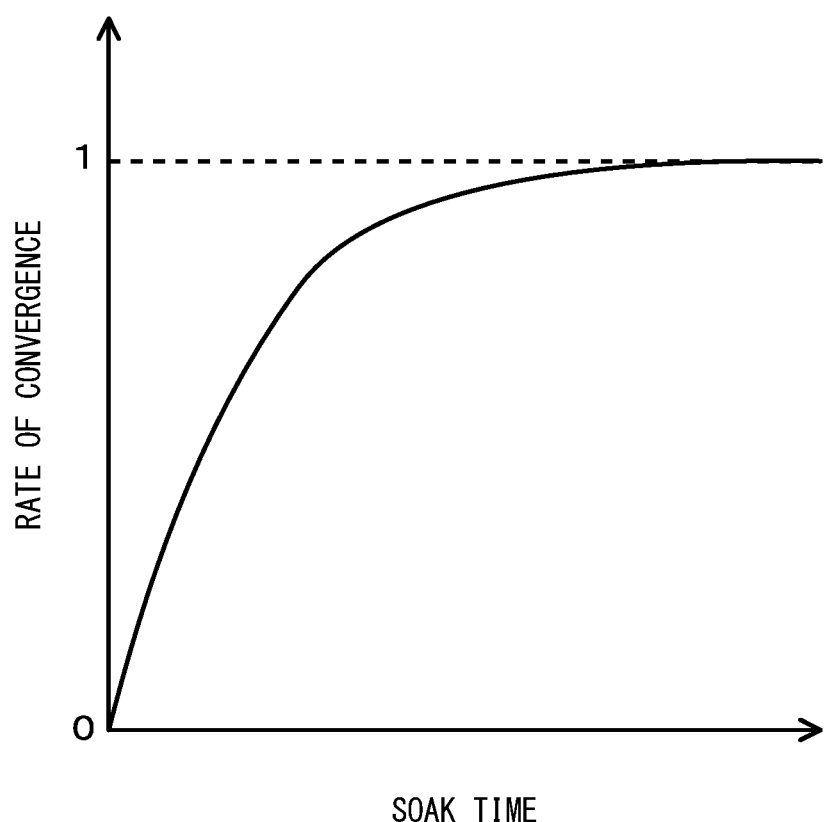
FIG. 4 is a table for calculating the rate of convergence κ of the catalyst bed temperature to an outside air temperature based on a soak time.

At step S107, while the engine was stopped, after the catalyst bed temperature gradually converges to the outside air temperature in accordance with the time elapsed from when the internal combustion engine 10 was stopped, that is, the soak time, the electronic control unit 200 refers to the table shown in FIG. 4 set in advance by experiments etc. and calculates the rate of convergence κ of the catalyst bed temperature to the outside air temperature based on the soak time. As shown in FIG. 4, the rate of convergence κ takes a value from 0 to 1. When the rate of convergence κ is 1, it shows that the catalyst bed temperature is converging to a temperature the same as the outside air temperature.

At step S108, the electronic control unit 200 enters into the following formula (6) the catalyst bed temperature while the engine is stopped $TEHC_{stop}$ and the intake temperature (outside air temperature) TIN to calculate the current estimated bed temperature $TEHC_{est}$ (that is, the estimated value of the catalyst bed temperature while the engine is off) and stores the estimated bed temperature $TEHC_{est}$ in the memory. Below, the estimated bed temperature $TEHC_{est}$ calculated at this step S107 and stored in the memory will, in accordance with need, be referred to as the "catalyst bed temperature $TEHC_{off}$ while the engine is off".

[Mathematical 5]

$$TEHC_{est} = TEHC_{stop} + (TIN - TEHC_{stop}) \times \kappa \quad (6)$$

At step S109, the electronic control unit 200 judges if the previous value of the engine operation flag F1 was "0", that is, whether the time is right after engine startup (whether the processing is the first one after engine startup). If the previous value of the engine operation flag F1 was "0", that is, the time is right after engine startup, the electronic control unit 200 proceeds to the processing of step S110. On the other hand, if the previous value of the engine operation flag F1 was "1", that is, if the engine is operating, the electronic control unit 200 proceeds to the processing of step S113.

At step S110, the electronic control unit 200 refers to the previous explained map of FIG. 4 and calculates the rate of convergence κ based on the soak time.

At step S111, the electronic control unit 200 enters into the above-mentioned formula (6) the catalyst bed temperature when the engine was stopped $TEHC_{stop}$ and the intake temperature (≈outside air temperature) TIN to calculate the current estimated bed temperature $TEHC_{est}$ (that is, the estimated value of the catalyst bed temperature when starting up the engine (right after engine startup)) and stores the estimated bed temperature $TEHC_{est}$ in the memory.

At step S112, the electronic control unit 200 returns the soak time to 0 and stops the soak timer.

At step S113, the electronic control unit 200 reads the detected values of the various estimation parameters for estimating the catalyst bed temperature during engine operation and calculates the amount of temperature change $\Delta$TEHC of the catalyst bed temperature per unit time (processing period) based on the detected values of the estimation parameters. During engine operation, the catalyst bed temperature TEHC changes due to the effect of the heat of exhaust, so for example it is possible to suitably select at least one parameter for use as the estimation-use parameter from the engine rotational speed or engine load, engine bed temperature, amount of intake, intake temperature, and other parameters having an effect on the amount of heat energy of the exhaust.

At step S114, the electronic control unit 200 adds the amount of temperature change $\Delta$TEHC to the estimated bed temperature $TEHC_{est}$ stored in the memory to update the estimated bed temperature $TEHC_{est}$ and stores the updated estimated bed temperature $TEHC_{est}$ in the memory.

In this way, in the present embodiment, the catalyst bed temperature is basically estimated based on the engine operating state, but due to various factors, sometimes the actual bed temperature $TEHC_{act}$ and the estimated bed temperature $TEHC_{est}$ diverge and the very calculation of the estimated bed temperature $TEHC_{est}$ is not possible.

In the present embodiment, in setting the state of charge for starting warmup SOC2, the estimated bed temperature $TEHC_{est}$ during the EV mode calculated at any time by the control for estimation of the catalyst bed temperature (=catalyst bed temperature when engine is stopped $TEHC_{off}$) is deemed the initial temperature TEHC0 to calculate the amount of base heating-use electric power $W_h$ in accordance with the above-mentioned formula (1). The state of charge for starting warmup SOC2 is set in accordance with the above-mentioned formula (4) using this amount of base heating-use electric power $W_h$.

For this reason, for example, if the actual bed temperature $TEHC_{act}$ and the estimated bed temperature $TEHC_{est}$ diverge and the estimated bed temperature $TEHC_{est}$ becomes lower than the actual bed temperature $TEHC_{act}$, the amount of base heating-use electric power $W_h$ becomes larger than necessary. As a result, the conductive base 151 is liable to end up being heated more than necessary and overheating is liable to end up promoting deterioration of the conductive base 151.

Further, if the estimated bed temperature $TEHC_{est}$ itself could not be calculated, it becomes no longer possible to set the state of charge for starting warmup SOC2 and becomes no longer possible to judge if the catalyst device 15 should be warmed up (that is, judgment if the catalyst bed temperature falls under the activation start temperature TEHC1 or the activation temperature TEHC2). If, in this way, forcibly warming up the catalyst device 15 by electrical heating in the state where the catalyst bed temperature cannot be grasped, again, the conductive base 151 is liable to end up being heated more than necessary and overheating is liable to end up promoting deterioration of the conductive base 151.

Therefore, when overheating is liable to occur if ending up warming up the catalyst device 15 by electrical heating, it can be said to be desirable to not warm up the catalyst device 15 by electrical heating but for example to retard the ignition timing after startup of the internal combustion engine 10 etc. to control the exhaust temperature to a higher temperature than usual (for example, if the catalyst device 15 was warmed up by electrical heating, if the time period during which the internal combustion engine 10 is stopped was short and the extent of drop in the catalyst bed temperature was small, and otherwise when the catalyst bed temperature becomes higher than the activation start temperature TEHC1 (or the activation temperature TEHC2) and the catalyst device 15 does not have to be warmed up) to make the internal combustion engine 10 operate to complete the warmup of the catalyst device 15 early.

Therefore, in the present embodiment, it is judged whether to permit warmup of the catalyst device 15 by electrical heating and perform control for catalyst warmup corresponding to the result of judgment. Below, first, referring to FIG. 5, control for judging permission for electrical heating which judges whether to permit warmup of the catalyst device 15 by electrical heating will be explained.

Figure 5:
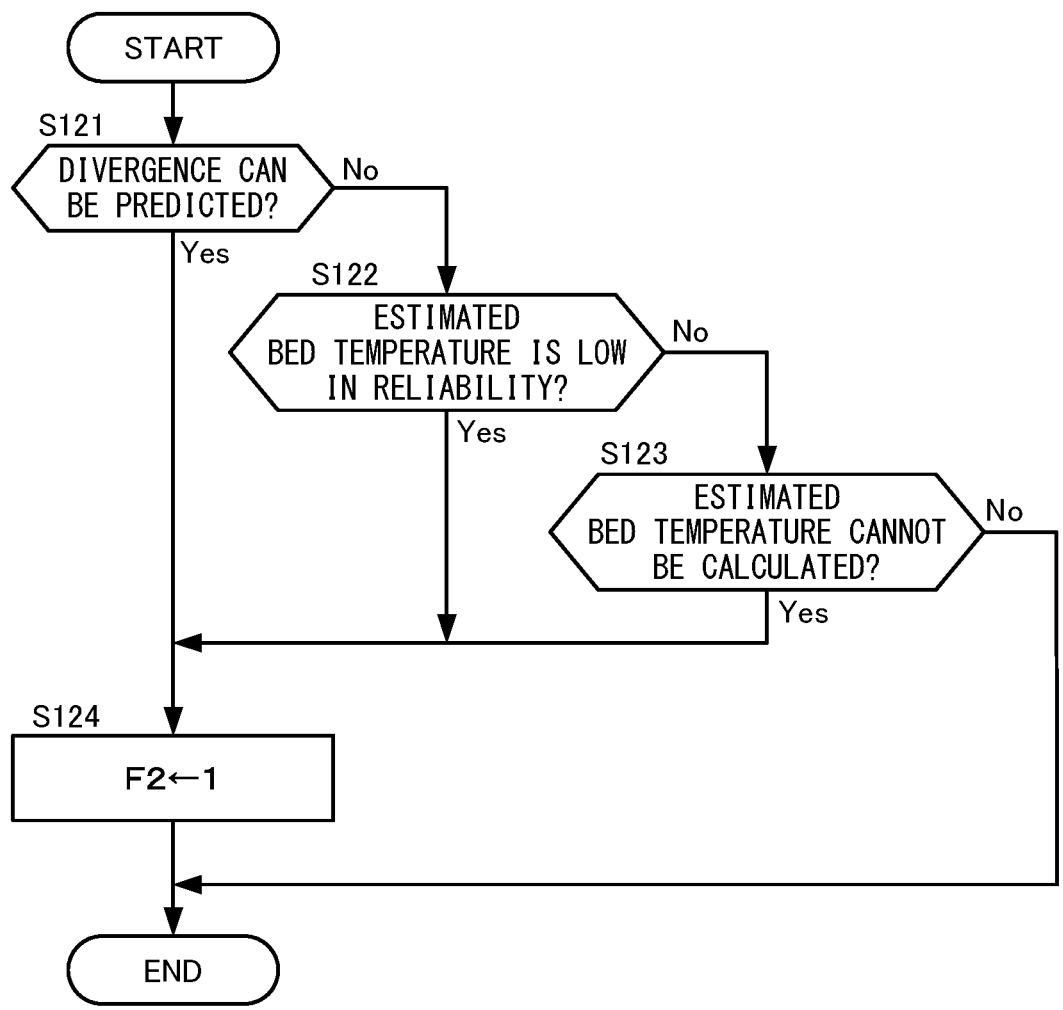
FIG. 5 is a flow chart for explaining control for judging permission for electrical heating according to one embodiment of the present disclosure.

FIG. 5 is a flow chart for explaining control for judging permission for electrical heating according to the present embodiment. The electronic control unit 200 repeatedly performs the present routine by a predetermined processing period (for example 10 ms).

At step S121, the electronic control unit 200 judges if there is a high possibility of the actual bed temperature $TEHC_{act}$ and the estimated bed temperature $TEHC_{est}$ diverging, in other words, if it can be predicted that the estimated bed temperature $TEHC_{est}$ is diverging from the actual bed temperature $TEHC_{act}$.

For example, sometimes the memory is initialized due to the battery being drained, the battery being replaced, etc. If the memory is initialized, the value of the catalyst bed temperature when the engine was stopped $TEHC_{stop}$ or of the soak time which had been stored in the memory is returned to the initial value which was set in advance (for example, if the catalyst bed temperature when the engine was stopped $TEHC_{stop}$, 20° C. corresponding to ordinary temperature, if the soak time, 0 s, etc.) Further, sometimes, if the electronic control unit 200 suffers from some sort of problem, the soak timer is not started up, and the soak time remains as the initial value or if the intake temperature sensor 215 suffers from some sort of problem, the value of the intake temperature TIN becomes an abnormal value.

The catalyst bed temperature when the engine is stopped $TEHC_{stop}$, the soak time used for calculation of the rate of convergence $\kappa$, and the intake temperature TIN are parameters required when calculating the estimated bed temperature $TEHC_{est}$ in accordance with the above-mentioned formula (6).

For this reason, when these parameters are returned to the initial values and otherwise become abnormal values, the values of the parameters scheduled to be used for calculating the estimated bed temperature $TEHC_{est}$ (that is, the value of the catalyst bed temperature when the engine was stopped $TEHC_{stop}$, the soak time, etc. before initialization stored in the memory) and the value of the parameter actually used for calculating the estimated bed temperature $TEHC_{est}$ (that is, the value of the catalyst bed temperature when the engine was stopped $TEHC_{stop}$ or the soak time after initialization of the memory) diverge. As a result, the actual bed temperature $TEHC_{act}$ and the estimated bed temperature $TEHC_{est}$ diverge.

Therefore, when at least some of the parameters necessary when calculating the estimated bed temperature $TEHC_{est}$ are abnormal values, there is a high possibility that the actual bed temperature $TEHC_{act}$ and the estimated bed temperature $TEHC_{est}$ are diverging and it can be predicted that the estimated bed temperature $TEHC_{est}$ is diverging from the actual bed temperature $TEHC_{act}$. At such a time, if trying to warm up the catalyst device 15 by electrical heating, overheating is liable to occur.

Therefore, the electronic control unit 200 according to the present embodiment judges if, at step S121, at least some of the parameters required when calculating the estimated bed temperature $TEHC_{est}$, that is, the catalyst bed temperature when the engine is stopped $TEHC_{stop}$, the soak time, and the intake temperature TIN, have become abnormal values. Further, when at least some of these parameters have become abnormal values, the electronic control unit 200 can predict that the estimated bed temperature $TEHC_{est}$ is diverging from the actual bed temperature $TEHC_{act}$, so it proceeds to the processing of step S124 prohibiting warmup of the catalyst device 15 by electrical heating. On the other hand, if these parameters become abnormal values, the electronic control unit 200 proceeds to the processing of step S122.

At step S122, regardless of whether the actual bed temperature $TEHC_{act}$ and the estimated bed temperature $TEHC_{est}$ have actually diverged, the electronic control unit 200 judges if the estimated bed temperature $TEHC_{est}$ estimated by the control for estimation of the catalyst bed temperature is low in reliability.

While not leading to initialization of the memory etc., for example, due to the effect of a change in the amount of heat radiated from the conductive base 151 resulting from meteorological conditions (air temperature, rain, snow, wind, etc.) or cooling due to a car wash given while the vehicle 100 is stopped or the like, sometimes the actual bed temperature $TEHC_{act}$ and the estimated bed temperature $TEHC_{est}$ will unexpectedly diverge.

Here, as the method of estimating the catalyst bed temperature, in addition to the method of estimation according to the engine operating state by the above-mentioned control for estimation of the catalyst bed temperature, for example, there is the method of utilizing the temperature-resistance characteristic of the conductive base 151 (in the present embodiment, a negative temperature coefficient where the resistance value falls the more the temperature rises) for estimation based on the base resistance value R detected at the time of supply of current to the conductive base 151.

Therefore, when the estimated bed temperature $TEHC_{est}$ calculated by the above-mentioned control for estimation of the catalyst bed temperature and the estimated value of the catalyst bed temperature calculated by a method other than the control for estimation of the catalyst bed temperature diverge, leaving aside whether the actual bed temperature $TEHC_{act}$ and the estimated bed temperature $TEHC_{est}$ calculated by the control for estimation of the catalyst bed temperature actually diverge, the estimated bed temperature $TEHC_{est}$ calculated by the control for estimation of the catalyst bed temperature can be said to be low in reliability. Further, when the estimated bed temperature $TEHC_{est}$ calculated by the control for estimation of the catalyst bed temperature is low in reliability, there is a possibility of the estimated bed temperature $TEHC_{est}$ diverging from the actual bed temperature $TEHC_{act}$. If ending up warming up the catalyst device 15 by electrical heating at this time, overheating is liable to occur.

Therefore, at this step S122, the electronic control unit 200 according to the present embodiment temporarily supplies current to the conductive base 151 and calculates the current base resistance value R based on the base applied voltage $V_h$ detected by the voltage sensor 154 at that time and the current value $I_h$ detected by the current sensor 155. Note that the conductive base 151 may be supplied with current by, for example, judging if the vehicle has been started up or the state of charge of the battery SOC has become the state of charge for starting warmup SOC2 or otherwise when the timing is suitable and by supplying it with current once at that time.

Figure 6:
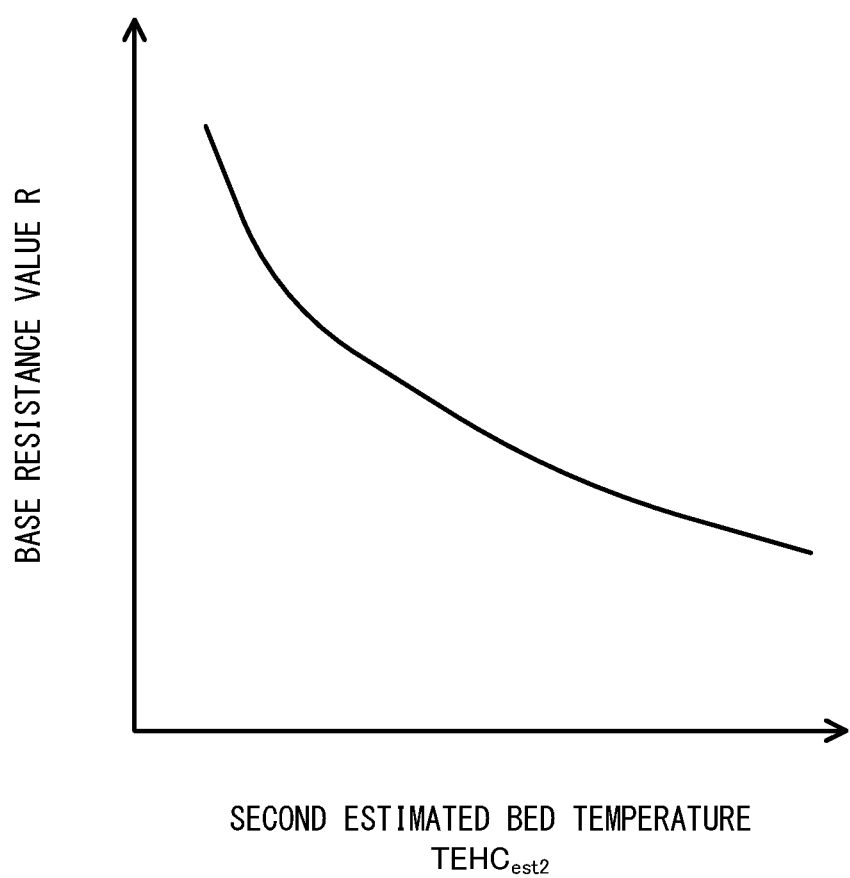
FIG. 6 is a table for estimating the catalyst bed temperature based on a base resistance value.

Further, the electronic control unit 200 refers to the table of FIG. 6 prepared in advance by experiments etc. and estimates the current catalyst bed temperature based on the current base resistance value R which is calculated. Below, the current catalyst bed temperature estimated by a method other than this control for estimation of the catalyst bed temperature will be referred to as the "second estimated bed temperature $TEHC_{est2}$".

Finally, the electronic control unit 200 compares the second estimated bed temperature $TEHC_{est2}$ and the estimated bed temperature $TEHC_{est}$ stored in the memory. If the absolute value of the difference of these is equal to or greater than a predetermined value, it judges that the estimated bed temperature $TEHC_{est}$ is low in reliability and proceeds to the processing of step S124. If the absolute value of the difference of these is less than the predetermined value, it proceeds to the processing of step S123.

At step S123, the electronic control unit 200 judges if the very calculation of the estimated bed temperature $TEHC_{est}$ is not possible.

For example, sometimes the memory suffers from some sort of problem and the value of the catalyst bed temperature $TEHC_{stop}$ when the engine is stopped or the soak time becomes missing or the intake temperature sensor 215 suffers from some sort of problem and the intake temperature TIN cannot be detected and the value of the intake temperature TIN becomes missing. If in this way a parameter required when calculating the estimated bed temperature $TEHC_{est}$ ends up missing, the very calculation of the estimated bed temperature $TEHC_{est}$ is no longer possible. If in this way the estimated bed temperature $TEHC_{est}$ is unclear, the state of charge for starting warmup SOC2 cannot be set and, further, it inherently becomes no longer possible to judge if the catalyst device 15 should be warmed up, so the catalyst device 15 cannot be suitably warmed up and therefore if ending up warming up the catalyst device 15 by electrical heating, overheating is liable to occur.

Therefore, at this step S123, the electronic control unit 200 according to the present embodiment judges if at least one value of the catalyst bed temperature when the engine is stopped $TEHC_{stop}$, the soak time, or the intake temperature TIN is missing. If judging that at least one value is missing, it judges that the very calculation of the estimated bed temperature $TEHC_{est}$ is not possible and proceeds to the processing of step S124. On the other hand, if these values are not missing, the electronic control unit 200 ends the current processing.

At step S124, the electronic control unit 200 sets the electrical heating prohibit flag F2 to "1". Note that the initial value of the electrical heating prohibit flag F2 is set to "0". After the flag is set to "1" in the present control, it is returned to "0" in the later explained control for catalyst warmup.

Note that, in the present embodiment, as shown in the flow chart of FIG. 5, as the condition for judgment for judging whether to permit warmup of the catalyst device 15 by electrical heating, the three conditions for judgment shown in step S121 to step S123 may be mentioned. When at least one condition for judgment among these three conditions for judgment stands, warmup of the catalyst device 15 by electrical heating is prohibited, but it is also possible to use only one or two of the conditions for judgment among these three conditions for judgment to judge whether to permit warmup of the catalyst device 15 by electrical heating.

Next, referring to FIG. 7, control for catalyst warmup according to the present embodiment will be explained.

Figure 7:
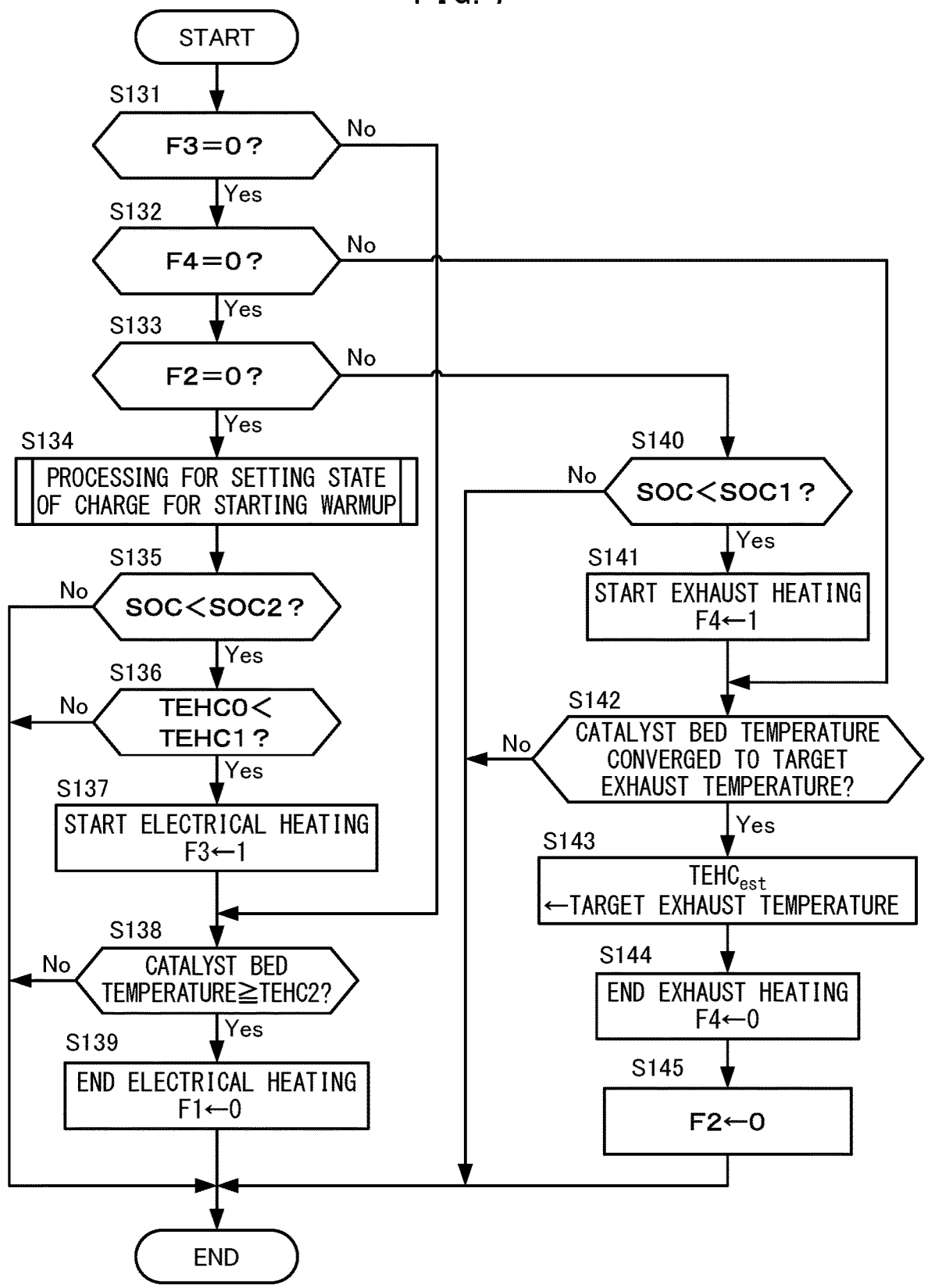
FIG. 7 is a flow chart for explaining control for warming up the catalyst according to one embodiment of the present disclosure.

FIG. 7 is a flow chart explaining control for catalyst warmup according to the present embodiment. When the vehicle 100 is being started up, that is, when the start switch 214 is in the ON state, the electronic control unit 200 repeatedly performs the present routine by a predetermined processing period (for example, 10 ms).

At step S131, the electronic control unit 200 judges if the electrical heating flag F3 has been set to "0". The electrical heating flag F3 is a flag which is set to "1" when starting to warm up the catalyst device 15 by electrical heating. The initial value is set to "0". If the electrical heating flag F3 is "0", the electronic control unit 200 proceeds to the processing of step S132. On the other hand, if the electrical heating flag F1 is "1", the electronic control unit 200 proceeds to the processing of step S138.

At step S132, the electronic control unit 200 judges if the exhaust heating flag F4 has been set to "0". The exhaust heating flag F4 is a flag which is set to "1" when making the internal combustion engine 10 start up and starting to warm up the catalyst device 15 by exhaust heat. The initial value is set to "0". If the exhaust heating flag F4 is "0", the electronic control unit 200 proceeds to the processing of step S133. On the other hand, if the electric heating flag F4 is "1", the electronic control unit 200 proceeds to the processing of step S142.

At step S133, the electronic control unit 200 reads the electrical heating prohibit flag F2 and judges if the electrical heating prohibit flag F2 has been set to "0". If the electrical heating prohibit flag F2 has been set to "0", the electronic control unit 200 proceeds to the processing of step S134. On the other hand, if the electrical heating prohibit flag F2 has been set to "1", the electronic control unit 200 proceeds to the processing of step S140.

Figure 8:
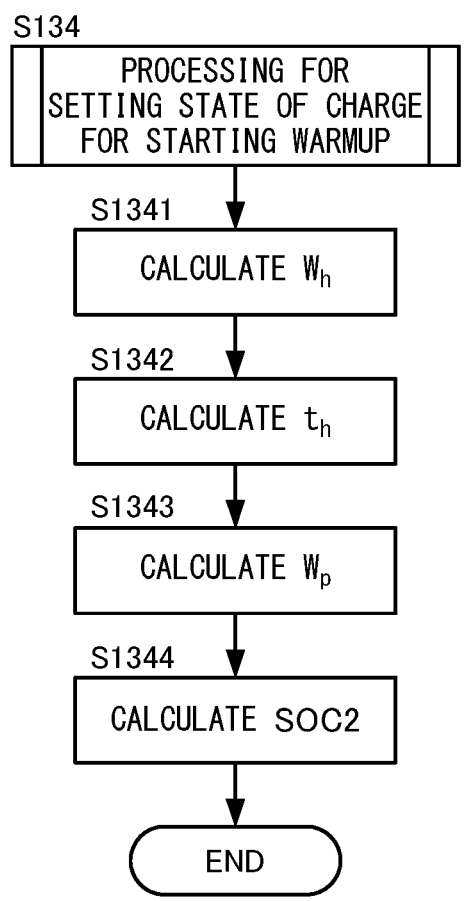
FIG. 8 is a flow chart for explaining details of processing for setting a state of charge for starting warmup.

At step S134, the electronic control unit 200 performs the processing for setting the state of charge for starting warmup for setting the state of charge for starting warmup SOC2. Details of the processing for setting the state of charge for starting warmup will be explained referring to FIG. 8.

At step S1341, the electronic control unit 200 reads the current estimated bed temperature $TEHC_{est}$ while the engine is stopped, calculated at any time by the control for estimation of the catalyst bed temperature (=catalyst bed temperature when the engine was stopped $TEHC_{off}$) as the initial temperature TEHC0 and calculates the amount of base heating-use electric power $W_h$ based on the above-mentioned formula (1).

At step S1342, the electronic control unit 200 reads the initial value of the base resistance R0 found in advance by experiments etc. and stored in the memory and calculates the heating time $t_h$ required for raising the catalyst bed temperature from the initial temperature TEHC0 to the activation temperature TEHC2 based on the above-mentioned formula (3).

At step S1343, the electronic control unit 200 enters the heating time $t_h$ in the above-mentioned formula (5) to calculate the amount of electric power for powered operation $W_p$.

At step S1344, the electronic control unit 200 enters the amount of base heating-use electric power $W_h$, the amount of electric power for powered operation $W_p$, and the state of charge for switching the mode SOC1 into the above-mentioned formula (4) to calculate the state of charge for starting warmup SOC2.

Returning to FIG. 7, at step S135, the electronic control unit 200 judges if the state of charge of the battery SOC is less than the state of charge for starting warmup SOC2. If the state of charge of the battery SOC is less than the state of charge for starting warmup SOC2, the electronic control unit 200 proceeds to the processing of step S136. On the other hand, if the state of charge of the battery SOC is equal to or greater than the state of charge for starting warmup SOC2, the electronic control unit 200 ends the current processing.

At step S136, the electronic control unit 200 judges if the current estimated bed temperature $TEHC_{est}$ when the engine is stopped read at step S1341, that is, the initial temperature TEHC0, is less than the activation start temperature TEHC1. If the initial temperature TEHC0 is less than the activation start temperature TEHC1, the electronic control unit 200 proceeds to the processing of step S137. On the other hand, if the initial temperature TEHC0 is equal to or greater than the activation start temperature TEHC1, the exhaust purification function of the catalyst starts to come into play, so the electronic control unit 200 ends the current processing.

Note that in the present embodiment, in the present step, it is judged if the initial temperature TEHC0 is less than the activation start temperature TEHC1 and the processing of step S5 is proceeded to or the current processing is ended, but it is also possible to judge if the initial temperature TEHC0 is less than the activation temperature TEHC2 and then proceed to the processing of step S137 or end the current processing.

At step S137, the electronic control unit 200 starts supply of current to the conductive base 151 to start warming up the catalyst device 15 and sets the electrical heating flag F1 to "1". In the present embodiment, the electronic control unit 200 controls the voltage adjustment circuit 153 so that the base applied voltage $V_h$ becomes the rated voltage $V_{max}$ so as to warm up the catalyst device 15.

At step S138, the electronic control unit 200 judges if the catalyst bed temperature has become equal to or greater than the activation temperature TEHC2. In the present embodiment, if the cumulative value of the base supplied electric power $P_h$ from when starting the warmup of the catalyst device 15, that is, the amount of electric power supplied to the conductive base 151, becomes equal to or greater than the amount of base heating-use electric power $W_h$, the electronic control unit 200 judges that the catalyst bed temperature has become equal to or greater than the activation temperature TEHC2 and proceeds to the processing of step S139. On the other hand, if the catalyst bed temperature is less than the activation temperature TEHC2, the electronic control unit 200 ends the current processing.

At step S139, the electronic control unit 200 stops the supply of current to the conductive base 151 to end the warmup of the catalyst device 15 and returns the electrical heating flag F1 to "0".

At step S140, the electronic control unit 200 judges if the state of charge of the battery SOC is less than the state of charge for switching the mode SOC1. If the state of charge of the battery SOC is less than the state of charge for switching the mode SOC1, the electronic control unit 200 proceeds to the processing of step S141. On the other hand, if the state of charge of the battery SOC is equal to or greater than the state of charge for switching the mode SOC1, the electronic control unit 200 ends the current processing.

At step S141, the electronic control unit 200 makes the internal combustion engine 10 start up and makes the catalyst device 15 finish being warmed up early by, for example, retarding the ignition timing etc. to control the exhaust temperature to a higher temperature than the usual time when the catalyst device 15 does not need to be warmed up to thereby operate the internal combustion engine 10.

At this time, in the present embodiment, further, to maintain the exhaust temperature at a predetermined target exhaust temperature, the engine load and engine rotational speed are maintained at a predetermined target load and target rotational speed set in advance to make the internal combustion engine 10 operate. This is due to the following reason.

That is, when warming up the catalyst device 15 by the exhaust heat, basically, the actual bed temperature $TEHC_{act}$ and the estimated bed temperature $TEHC_{est}$ are liable to diverge and the accurate actual bed temperature $TEHC_{act}$ can no longer be grasped. At this time, if making the internal combustion engine 10 operate for a certain constant time period in the state maintaining the exhaust temperature at a predetermined target exhaust temperature, the catalyst bed temperature can be made to converge to the target exhaust temperature, so the actual bed temperature $TEHC_{act}$ can be deemed to have become the target exhaust temperature and the accurate actual bed temperature $TEHC_{act}$ can be grasped.

At step S142, the electronic control unit 200 judges whether the catalyst bed temperature has converged to the target exhaust temperature. In the present embodiment, if the cumulative value of the amount of intake air from when making the internal combustion engine 10 start up becomes equal to or more than a predetermined first cumulative value, the electronic control unit 200 judges that the catalyst bed temperature has converged at the target exhaust temperature and proceeds to the processing of step S143. On the other hand, if the cumulative value of the amount of intake air from when making the internal combustion engine 10 start up is less than the predetermined first cumulative value, the electronic control unit 200 judges that the catalyst bed temperature has not converged at the target exhaust temperature and ends the current processing. Note that, judgment of whether the catalyst bed temperature has converged to the target exhaust temperature is not limited to this. For example, it is also possible to judge if the time elapsed from when starting up the internal combustion engine 10 has become equal to or greater than a predetermined time.

At step S143, the electronic control unit 200 corrects the estimated bed temperature $TEHC_{est}$ stored in the memory to the target exhaust temperature. In this way, when maintaining the exhaust temperature at the target exhaust temperature and making the internal combustion engine 10 operate for exactly a predetermined time period, it is possible to correct the estimated bed temperature $TEHC_{est}$ to the target exhaust temperature to thereby make the actual bed temperature $TEHC_{act}$ and the estimated bed temperature $TEHC_{est}$ match.

At step S144, the electronic control unit 200 ends the warmup of the catalyst device 15 by the exhaust heat and returns the electrical heating flag F4 to "0". Specifically, the electronic control unit 200 ends the control for rendering the exhaust temperature higher than usual and the control for maintaining the exhaust temperature at a predetermined target temperature.

At step S145, the electronic control unit 200 returns the electrical heating prohibit flag F2 to "0".

Figure 9:
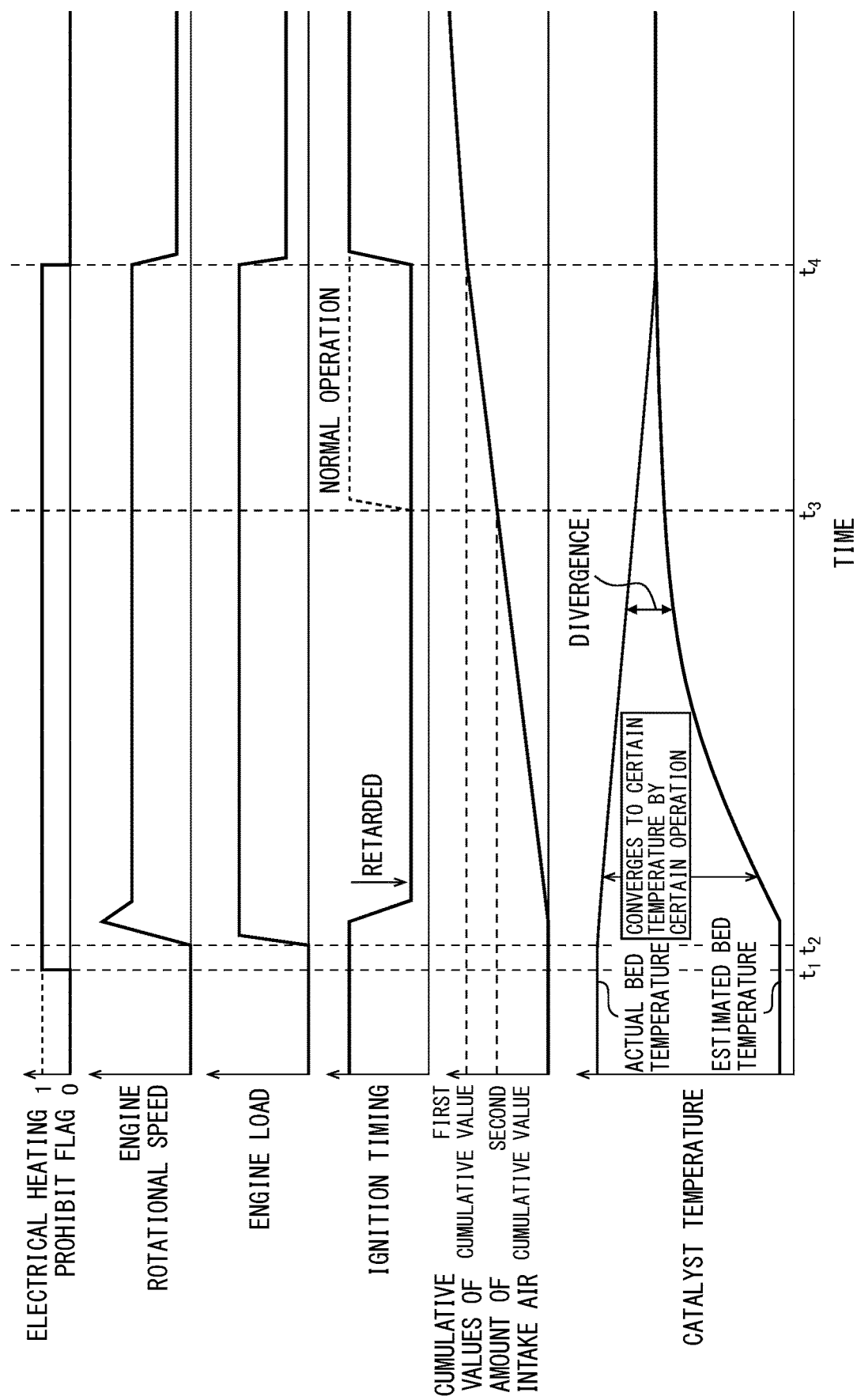
FIG. 9 is a time chart explaining operation of control for warming up the catalyst according to one embodiment of the disclosure.

FIG. 9 is a time chart explaining the operation of the control for catalyst warmup according to the present embodiment. Note that FIG. 9 shows a time chart of the case where, at the time t1, the electrical heating prohibit flag F2 is set to "1" by the control for judging permission for electrical heating and, along with this, warmup of the catalyst device 15 by electrical heating is prohibited and the catalyst device 15 is warmed up by the exhaust heat.

At the time t2, if the internal combustion engine 10 is started up in the state where the catalyst device 15 is not being warmed up by electrical heating, the ignition timing is retarded so as to make the catalyst device 15 quickly finish being warmed up. Further, along with this, to make the estimated bed temperature $TEHC_{est}$ match the actual bed temperature $TEHC_{act}$, the engine load and engine rotational speed are maintained at the predetermined target load and target rotational speed set in advance and the exhaust temperature is maintained at the predetermined target exhaust temperature.

In the past, when using exhaust heat to warm up the catalyst device 15, at the time t3, when the cumulative value of the amount of intake air becomes a predetermined second cumulative value and the estimated bed temperature $TEHC_{est}$ can be deemed to have become the activation temperature TEHC2, the control for rendering the exhaust temperature a high temperature is made to end and the ignition timing is returned to the ignition timing when usual.

As opposed to this, the first cumulative value comprised of the cumulative value of the amount of intake air required until the catalyst bed temperature converges to the target exhaust temperature tends to become larger than the above-mentioned second cumulative value. For this reason, in the present embodiment, until the cumulative value of the amount of intake air becomes the predetermined first cumulative value at the time t4, the ignition timing is retarded while maintaining the engine load and engine rotational speed at a predetermined target load and target rotational speed so that the exhaust temperature is maintained at the predetermined target exhaust temperature.

Further, if at the time t4 the cumulative value of the amount of intake air becomes the predetermined first cumulative value, it is judged that the actual bed temperature $TEHC_{act}$ and the estimated bed temperature $TEHC_{est}$ match, the electrical heating prohibit flag F2 is returned to "0", and control for raising the exhaust temperature to a high temperature (in the present embodiment, control for retarding ignition timing) and control for maintaining the exhaust temperature at the target exhaust temperature are made to end. Further, if at the time t4 it is judged that the actual bed temperature $TEHC_{act}$ has converged to the target exhaust temperature, the estimated bed temperature $TEHC_{est}$ stored in the memory is corrected to the target exhaust temperature.

Due to this, when the actual bed temperature $TEHC_{act}$ and the estimated bed temperature $TEHC_{est}$ diverge etc., the estimated bed temperature $TEHC_{est}$ can be made to match the actual bed temperature $TEHC_{act}$, so after that, the precision of calculation of the estimated bed temperature $TEHC_{est}$ can be improved.

The vehicle 100 according to the present disclosure explained above is provided with an internal combustion engine 10 and an electrical heating type of catalyst device 15 provided in an exhaust passage of the internal combustion engine 10 and supporting a catalyst on a conductive base 151 generating heat by the supply of current. The electronic control unit 200 (control device) controlling this vehicle 100 is provided with an estimated temperature calculation part calculating the estimated bed temperature $TEHC_{est}$ (estimated temperature) of the conductive base 151 based on the engine operating state, an electrical heating permission judgment part judging if to permit warmup of the catalyst device 15 by electrical heating, and a catalyst warmup control part using electrical heating to warm up the catalyst device 15 when electrical heating is permitted and using heat of exhaust discharged from the internal combustion engine 10 to warm up the catalyst device 15 when electrical heating is prohibited. Further the electrical heating permission judgment part is configured to prohibit warmup of the catalyst device 15 by electrical heating when at least one of the following stands: when it is predicted that the actual bed temperature $TEHC_{act}$ of the conductive base 151 (the actual temperature) is diverging from the estimated bed temperature $TEHC_{est}$, when the estimated bed temperature $TEHC_{est}$ is low in reliability, or when the estimated bed temperature $TEHC_{est}$ cannot be calculated.

When it is predicted that the actual bed temperature $TEHC_{act}$ of the conductive base 151 is diverging from the estimated bed temperature $TEHC_{est}$, when the estimated bed temperature $TEHC_{est}$ is low in reliability, or when the estimated bed temperature $TEHC_{est}$ cannot be calculated, it is not possible to obtain a grasp of the suitable timing for using electrical heating to warm up the catalyst device 15. For this reason, if ending up warming up the catalyst device 15 by electrical heating, the conductive base 151 is liable to end up being heated more than necessary and deterioration of the conductive base 151 is liable to end up being promoted.

As opposed to this, in the present embodiment, when it is predicted that the actual bed temperature $TEHC_{act}$ of the conductive base 151 will deviate from the estimated bed temperature $TEHC_{est}$, when the estimated bed temperature $TEHC_{est}$ is low in reliability, or when the estimated bed temperature $TEHC_{est}$ cannot be calculated, warmup of the catalyst device by electrical heating is prohibited and the heat of exhaust discharged from the internal combustion engine 10 is used to warm up the catalyst device 15.

If using exhaust heat to warm up the catalyst device 15, the actual bed temperature $TEHC_{act}$ of the conductive base 151 will only rise up to the exhaust temperature. For this reason, when it is no longer possible to obtain a suitable grasp of the timing for warming up the catalyst device 15 by electrical heating, warmup of the catalyst device 15 by electrical heating is prohibited and exhaust heat is used to warm up the catalyst device 15 to thereby keep the conductive base 151 from ending up being heated more than necessary.

Further, the catalyst warmup control part according to the present embodiment is configured so that when using the heat of exhaust discharged from the internal combustion engine 10 to warm up the catalyst device 15, control is performed to render the exhaust temperature a higher temperature than when the catalyst device 15 does not have to be warmed up while making the internal combustion engine 10 operate.

As explained above, when it is predicted that the actual bed temperature $TEHC_{act}$ of the conductive base 151 will deviate from the estimated bed temperature $TEHC_{est}$, when the estimated bed temperature $TEHC_{est}$ is low in reliability, or when the estimated bed temperature $TEHC_{est}$ cannot be calculated, it becomes no longer possible to obtain a grasp of the suitable timing for using electrical heating to warm up the catalyst device 15. For this reason, if warming up the catalyst device 15 by electrical heating, sometimes the internal combustion engine 10 has to be made to start up before insufficient heating of the conductive base 151 causes the catalyst device 15 to not finish being warmed up. Further, in this case, after startup of the internal combustion engine 10, no measure is taken to quickly complete the warmup of the catalyst device 15, so the time until the catalyst device 15 finishes warming up is liable to become longer and as a result the exhaust emission after engine startup is liable to deteriorate.

As opposed to this, in the present embodiment, when using the heat of exhaust discharged from the internal combustion engine 10 to warm up the catalyst device 15, control is performed to raise the exhaust temperature to a higher temperature than usual when the catalyst device 15 does not need to warm up while the internal combustion engine 10 is operated, so after startup of the internal combustion engine 10, the time until the catalyst device 15 finishes being warmed up can be reduced to a minimum, so it is possible to keep the exhaust emission from deteriorating after engine startup.

Further, the catalyst warmup control part according to the present embodiment is further configured so that the internal combustion engine 10 is made to operate so that when using the heat of exhaust discharged from the internal combustion engine 10 to warm up the catalyst device 15, the exhaust temperature is maintained at the target exhaust temperature set in advance for a predetermined time period from starting up the internal combustion engine 10. The predetermined time period is the time period by which the actual bed temperature $TEHC_{act}$ of the conductive base 151 can be deemed to have converged at the target exhaust temperature.

Due to this, it is possible to make the actual bed temperature $TEHC_{act}$ converge at the target exhaust temperature when it is predicted that the actual bed temperature $TEHC_{act}$ of the conductive base 151 will diverge from the estimated bed temperature $TEHC_{est}$, when the estimated bed temperature $TEHC_{est}$ falls in reliability, or when the estimated bed temperature $TEHC_{est}$ could not be calculated.

Further, the catalyst warmup control part is further configured so as to correct the estimated bed temperature $TEHC_{est}$ to the target exhaust temperature when maintaining the exhaust temperature at the target exhaust temperature and make the internal combustion engine 10 operate for exactly a predetermined time period.

Due to this, when the actual bed temperature $TEHC_{act}$ and the estimated bed temperature $TEHC_{est}$ diverge etc., the estimated bed temperature $TEHC_{est}$ can be made to match the actual bed temperature $TEHC_{act}$, so it is possible to improve the subsequent precision of calculation of the estimated bed temperature $TEHC_{est}$.

Further, the catalyst warmup control part is configured so that when maintaining the exhaust temperature at the target exhaust temperature for exactly a predetermined time period to make the internal combustion engine 10 operate, it lifts the prohibition of warmup of the catalyst device 15 by electrical heating. Due to this, due to the above-mentioned control for judging permission for electrical heating, it is possible to warm up the catalyst device 15 by electrical heating until the electrical heating prohibit flag F2 is again set to "1", so it is possible to keep the exhaust emission from deteriorating after engine startup.

Note that, in the present embodiment, the electrical heating permission judgment part is configured so as to deem that when the value of at least some of the parameters used when calculating the estimated bed temperature $TEHC_{est}$ based on the engine operating state is an abnormal value, it is predicted that the actual bed temperature $TEHC_{act}$ of the conductive base 151 will diverge from the estimated bed temperature $TEHC_{est}$ and prohibit warmup of the catalyst device 15 by electrical heating.

Further, the electrical heating permission judgment part is configured to deem that when the value of at least part of the parameters used when calculating the estimated bed temperature $TEHC_{est}$ based on the engine operating state is missing, it cannot calculate the estimated bed temperature $TEHC_{est}$ and prohibits warmup of the catalyst device 15 by electrical heating.

Further, the electrical heating permission judgment part is configured to deem the estimated bed temperature $TEHC_{est}$ is low in reliability and prohibit warmup of the catalyst device 15 by electrical heating when the difference between the estimated bed temperature $TEHC_{est}$ calculated based on the engine operating state and the second estimated temperature $TEHC_{est2}$ of the conductive base 151 calculated by a method different from the method of estimation of the conductive base 151 based on the engine operating state becomes equal to or greater than a predetermined value.

Further, in the present embodiment, the parameter used when calculating the estimated bed temperature $TEHC_{est}$ based on the engine operating state is the time elapsed from when the internal combustion engine 10 was stopped (that is, the soak time), the estimated bed temperature $TEHC_{est}$ when the internal combustion engine 10 was stopped (that is, the catalyst bed temperature when the engine was stopped $TEHC_{stop}$), or the intake temperature TIN.

Above, embodiments of the present disclosure were explained, but the above embodiments only show some of the examples of application of the present disclosure and are not meant to limit the technical scope of the present disclosure to the specific configurations of the above embodiments.

For example, in the present embodiment, the amount of base heating-use electric power $W_h$ was made a variable value calculated in accordance with the above-mentioned formula (1), but the disclosure is not limited to this. For example, it may also be a fixed value which is set in advance.

The invention claimed is:

1. A control device for a vehicle that includes an internal combustion engine and an electrically heated type of catalyst device provided in an exhaust passage of the internal combustion engine that supports a catalyst on a conductive base generating heat by a supply of current, the control device comprising:
an estimated temperature calculation circuit that is configured to calculate an estimated temperature of the conductive base based on an engine operating state;
an electrical heating permission judgment circuit that is configured to judge whether to permit warmup of the catalyst device by electrical heating; and
a catalyst warmup control circuit that is configured to warm up the catalyst device by electrical heating when electrical heating is permitted and warm up the catalyst device by heat of exhaust discharged from the internal combustion engine when electrical heating is prohibited,
wherein:
the electrical heating permission judgment circuit is configured to prohibit warmup of the catalyst device by electrical heating at the time of at least one of the following: when it is predicted that an actual temperature of the conductive base has diverged from the estimated temperature, when the estimated temperature is low in reliability, or when it is not possible to calculate the estimated temperature, and
the electrical heating permission judgment circuit being further configured so as to deem that when the value of at least one of the parameters used when calculating the estimated temperature based on the engine operating state is missing, the estimated temperature cannot be calculated and so as to thereby prohibit warmup of the catalyst device by electrical heating.

2. The control device for a vehicle according to claim 1, wherein
the electrical heating permission judgment circuit is configured so as to deem that when the value of at least one of the parameters used when calculating the estimated temperature based on the engine operating state is an abnormal value, it is predicted that the actual temperature of the conductive base will diverge from the estimated temperature and so as to thereby prohibit warmup of the catalyst device by electrical heating.

3. The control device for a vehicle according to claim 2, wherein
the parameter is the elapsed time from when the internal combustion engine was stopped.

4. The control device for a vehicle according to claim 2, wherein
the parameter is the estimated temperature when the internal combustion engine was stopped.

5. The control device for a vehicle according to claim 2, wherein
the parameter is an intake temperature.

6. The control device for a vehicle according to claim 1, wherein
the electrical heating permission judgment circuit is configured to deem that the estimated temperature is low in reliability and to prohibit warming of the catalyst device by electrical healing when the difference between the estimated temperature calculated based on the engine operating state and the second estimated temperature of the conductive base calculated by a method different from the method of estimation of the temperature of the conductive base based on the engine operating state becomes equal to or greater than a predetermined value.

7. The control device for a vehicle according to claim 1, wherein
the catalyst warmup control circuit is further configured to make the internal combustion engine operate so that when using the heat of exhaust discharged from the internal combustion engine to warm up the catalyst device, the exhaust temperature is maintained at a target exhaust temperature set in advance for a predetermined time period from startup of the internal combustion engine, and
the predetermined time period is a time period in which it is deemed that the actual temperature of the conductive base has converged to the target exhaust temperature.

8. The control device for a vehicle according to claim 7, wherein
the catalyst warmup control circuit is configured to correct the estimated temperature to the target exhaust temperature when maintaining the exhaust temperature at the target exhaust temperature and operating the internal combustion engine for exactly the predetermined time.

9. The control device for a vehicle according to claim 7, wherein
the catalyst warmup control circuit is configured to lift the prohibition of warmup of the catalyst device by electrical heating when maintaining the exhaust temperature at the target exhaust temperature and operating the internal combustion engine fir exactly the predetermined time.

10. The control device for a vehicle according to claim 1, wherein
the catalyst warmup control circuit is configured to control the exhaust temperature to a higher temperature to make the internal combustion engine operate when using the heat of exhaust discharged from the internal combustion engine to warm up the catalyst device compared to when warmup of the catalyst device is not required.

11. A control device for a vehicle that includes an internal combustion engine and an electrically heated type of catalyst device provided in an exhaust passage of the internal combustion engine that supports a catalyst on a conductive base generating heat by a supply of current, the control device comprising:
- an estimated temperature calculation circuit that is configured to calculate an estimated temperature of the conductive base based on an engine operating state;
- an electrical heating permission judgment circuit that is configured to judge whether to permit warmup of the catalyst device by electrical heating; and
- a catalyst warmup control circuit that is configured to warm up the catalyst device by electrical heating when electrical heating is permitted and warm up the catalyst device by heat of exhaust discharged from the internal combustion engine when electrical heating is prohibited, wherein:
- the electrical heating permission judgment circuit is configured to prohibit warmup of the catalyst device by electrical heating at the time of at least one of the following: when it is predicted that an actual temperature of the conductive base has diverged from the estimated temperature, when the estimated temperature is low in reliability, or when it is not possible to calculate the estimated temperature, and
- the electrical heating permission judgment circuit is further configured so as to deem that when the value of the elapsed time from when the internal combustion engine was stopped is an abnormal value, it is predicted that the actual temperature of the conductive base will diverge from the estimated temperature and so as to thereby prohibit warmup of the catalyst device by electrical heating.

12. A control device for a vehicle that includes an internal combustion engine and an electrically heated type of catalyst device provided in an exhaust passage of the internal combustion engine that supports a catalyst on a conductive base generating heat by a supply of current, the control device comprising:
- an estimated temperature calculation circuit that is configured to calculate an estimated temperature of the conductive base based on an engine operating state;
- an electrical heating permission judgment circuit that is configured to judge whether to permit warmup of the catalyst device by electrical heating; and
- a catalyst warmup control circuit that is configured to warm up the catalyst device by electrical heating when electrical heating is permitted and warm up the catalyst device by heat of exhaust discharged from the internal combustion engine when electrical heating is prohibited, wherein:
- the electrical heating permission judgment circuit is configured to prohibit warmup of the catalyst device by electrical heating at the time of at least one of the following: when it is predicted that an actual temperature of the conductive base has diverged from the estimated temperature, when the estimated temperature is low in reliability, or when it is not possible to calculate the estimated temperature, and
- the catalyst warmup control circuit is further configured to control the exhaust temperature to a higher temperature to make the internal combustion engine operate when using the heat of exhaust discharged from the internal combustion engine to warm up the catalyst device compared to when warmup of the catalyst device is not required.

* * * * *